(12) United States Patent
Martin et al.

(10) Patent No.: US 11,461,110 B2
(45) Date of Patent: *Oct. 4, 2022

(54) SYSTEMS AND METHODS FOR AUTOMATED AND DISTRIBUTED CONFIGURATION OF COMPUTING DEVICES

(71) Applicant: Palantir Technologies Inc., Denver, CO (US)

(72) Inventors: Jeffrey Martin, New York, NY (US); Meghana Bhat, New York, NY (US); Nicholas Morgan, San Francisco, CA (US)

(73) Assignee: Palantir Technologies Inc., Denver, CO (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/330,247

(22) Filed: May 25, 2021

(65) Prior Publication Data

US 2021/0279073 A1   Sep. 9, 2021

Related U.S. Application Data

(63) Continuation of application No. 16/360,235, filed on Mar. 21, 2019, now Pat. No. 11,016,784.

(Continued)

(51) Int. Cl.
*G06F 9/00*        (2006.01)
*G06F 15/177*  (2006.01)
(Continued)

(52) U.S. Cl.
CPC .......... *G06F 9/4416* (2013.01); *G06F 9/4451* (2013.01); *G06F 9/45558* (2013.01);
(Continued)

(58) Field of Classification Search
CPC combination set(s) only.
See application file for complete search history.

(56) References Cited

U.S. PATENT DOCUMENTS 6,058,373 A   5/2000   Blinn et al.
7,263,560 B2  8/2007   Abdelaziz et al.
(Continued)

FOREIGN PATENT DOCUMENTS

WO   2015165111 A1   11/2015

OTHER PUBLICATIONS

Extended European Search Report for EP Appln. No. 20161777.6 dated Jun. 23, 2020, 10 pages.
(Continued)

*Primary Examiner* — Nitin G Patel
(74) *Attorney, Agent, or Firm* — Sheppard Mullin Richter & Hampton LLP (57) ABSTRACT

Systems and methods are provided for automated and distributed configuration of platform deployments on remote computing devices, such as laptop computers. The platform deployments can include services that mirror that of a server-based platform deployment. A centralized entity be used to generate and/or edit a single configuration file that contains multiple subset configuration files, each corresponding to a service to be deployed to each of the remote computing devices. The configuration file can be customized for the remote computing devices. Additionally, interaction between services can be achieved by using a templating language that allows certain aspects of the configuration file to include references to values.

20 Claims, 5 Drawing Sheets

Related U.S. Application Data (60) Provisional application No. 62/815,911, filed on Mar. 8, 2019.

(51) Int. Cl.

| | | |
|---|---|---|
| *G06F 9/4401* | (2018.01) | |
| *G06F 9/445* | (2018.01) | |
| *G06F 9/455* | (2018.01) | |
| *H04L 9/40* | (2022.01) | |

(52) U.S. Cl.
CPC .. *H04L 63/0435* (2013.01); *G06F 2009/4557* (2013.01); *G06F 2009/45562* (2013.01)

(56) References Cited

U.S. PATENT DOCUMENTS

| | | | |
|---|---|---|---|
| 7,286,836 | B2 | 10/2007 | Emmerson et al. |
| 7,765,278 | B2 | 7/2010 | Dove et al. |
| 7,814,234 | B2 | 10/2010 | Hawkins et al. |
| 7,912,935 | B2 | 3/2011 | Merissert-Coffinieres et al. |
| 8,285,860 | B2 | 10/2012 | McGuire et al. |
| 8,745,174 | B2 | 6/2014 | Bryan et al. |
| 8,819,106 | B1 | 8/2014 | Sirota et al. |
| 8,850,528 | B2 | 9/2014 | Van Biljon et al. |
| 8,904,477 | B2 | 12/2014 | Barton et al. |
| 8,935,620 | B1 | 1/2015 | Cox |
| 9,021,026 | B2 | 4/2015 | Hopkins et al. |
| 9,256,657 | B1 | 2/2016 | Evenson et al. |
| 9,300,534 | B2 | 3/2016 | Hopkins |
| 9,363,335 | B2 | 6/2016 | Han et al. |
| 9,521,194 | B1 | 12/2016 | Gabrielson |
| 9,910,697 | B2 | 3/2018 | DeArment |
| 10,044,836 | B2 | 8/2018 | Laub et al. |
| 10,152,384 | B1 | 12/2018 | Amit et al. |
| 10,216,485 | B2 | 2/2019 | Misra et al. |
| 2002/0073072 | A1 | 6/2002 | Fukumoto |
| 2003/0055927 | A1 | 3/2003 | Fischer et al. |
| 2003/0056206 | A1 | 3/2003 | Engo |
| 2004/0157641 | A1 | 8/2004 | Chithambaram et al. |
| 2005/0228711 | A1 | 10/2005 | Lahey et al. |
| 2005/0235012 | A1 | 10/2005 | Harry et al. |
| 2006/0004927 | A1 | 1/2006 | Rehman et al. |
| 2006/0047798 | A1 | 3/2006 | Feinleib |
| 2006/0059567 | A1 | 3/2006 | Bird et al. |
| 2006/0069704 | A1 | 3/2006 | Breeden et al. |
| 2006/0085837 | A1 | 4/2006 | Pesati et al. |
| 2006/0206485 | A1 | 9/2006 | Rubin et al. |
| 2007/0005801 | A1 | 1/2007 | Kumar et al. |
| 2007/0016676 | A1 | 1/2007 | Breuer et al. |
| 2007/0105597 | A1 | 5/2007 | Hwang |
| 2008/0010233 | A1 | 1/2008 | Sack et al. |
| 2008/0086540 | A1 | 4/2008 | Scott |
| 2008/0091747 | A1 | 4/2008 | Prahlad et al. |
| 2009/0132317 | A1 | 5/2009 | Dholakia et al. |
| 2009/0132710 | A1 | 5/2009 | Pelley |
| 2009/0222808 | A1 | 9/2009 | Faus et al. |
| 2009/0319529 | A1 | 12/2009 | Bartlett et al. |
| 2009/0327465 | A1 | 12/2009 | Flegg et al. |
| 2010/0011098 | A1 | 1/2010 | Sanborn et al. |
| 2010/0049959 | A1 | 2/2010 | Arcese et al. |
| 2010/0057515 | A1 | 3/2010 | Gandini et al. |
| 2010/0180337 | A1 | 7/2010 | Bajekal |
| 2010/0186020 | A1 | 7/2010 | Maddhirala et al. |
| 2010/0235525 | A1 | 9/2010 | McGuire et al. |
| 2011/0131448 | A1 | 6/2011 | Vasil et al. |
| 2012/0011207 | A1 | 1/2012 | Morris |
| 2012/0180068 | A1 | 7/2012 | Wein et al. |
| 2013/0070917 | A1 | 3/2013 | Nuestro et al. |
| 2014/0310328 | A1 | 10/2014 | Charif et al. |
| 2014/0310720 | A1 | 10/2014 | Song et al. |
| 2014/0379777 | A1 | 12/2014 | Yamamoto et al. |
| 2015/0067642 | A1 | 3/2015 | Chen et al. |
| 2015/0172412 | A1 | 6/2015 | Escriva et al. |
| 2016/0094497 | A1 | 3/2016 | Javed |
| 2016/0110183 | A1 | 4/2016 | Fu |
| 2016/0226871 | A1 | 8/2016 | Stephure |
| 2016/0335066 | A1 | 11/2016 | Zhang et al. |
| 2016/0335338 | A1 | 11/2016 | Beiter |
| 2017/0006113 | A1 | 1/2017 | Singhal |
| 2017/0075711 | A1 | 3/2017 | Berranae |
| 2017/0285981 | A1 | 10/2017 | DeArment et al. |
| 2017/0285982 | A1 | 10/2017 | DeArment et al. |
| 2018/0095739 | A1 | 4/2018 | Baset |
| 2018/0176336 | A1 | 6/2018 | Laub et al. |
| 2018/0309853 | A1 | 10/2018 | Laub et al. |

OTHER PUBLICATIONS

Garefalakis Panagiotis et al: "ACaZoo: A Distributed Key-Value Store Based on Replicated LSM-Trees", 2014 IEEE 33rd International Symposium on ReliableDistributed Systems, IEEE, Oct. 6, 2014, pp. 211-220, [retrieved on Dec. 11, 2014].

Notice of Allowance for U.S. Appl. No. 15/284,957 dated Oct. 25, 2017.

Notice of Allowance for U.S. Appl. No. 15/284,959 dated May 9, 2019.

Notice of Allowance for U.S. Appl. No. 16/023,286 dated Aug. 23, 2019.

Official Communication for European Patent Application No. 17178290.7 dated Nov. 15, 2018.

Official Communication for U.S. Appl. No. 15/284,957 dated Apr. 3, 2017.

Official Communication for U.S. Appl. No. 15/284,957 dated Jun. 2, 2017.

Official Communication for U.S. Appl. No. 15/284,959 dated Mar. 2, 2018.

Official Communication for U.S. Appl. No. 15/284,959 dated May 8, 2017.

Official Communication for U.S. Appl. No. 15/284,959 dated Oct. 19, 2017.

Official Communication for U.S. Appl. No. 15/383,812 dated Jun. 22, 2017.

Official Communication for U.S. Appl. No. 15/383,812 dated Mar. 28, 2018.

Official Communication for U.S. Appl. No. 15/383,812 dated Nov. 29, 2017.

Official Communication for U.S. Appl. No. 15/394,498 dated Feb. 19, 2019.

Official Communication for U.S. Appl. No. 15/394,498 dated Jan. 11, 2019.

Official Communication for U.S. Appl. No. 15/394,498 dated Jun. 24, 2019.

Official Communication for U.S. Appl. No. 16/023,286 dated Feb. 7, 2019.

Official Communication for U.S. Appl. No. 16/023,286 dated Oct. 5, 2018.

Official Communication for U.S. Patent Application No. 17178290.7 dated Nov. 20, 2017.

Shrivastava et al., "Architectural Support for Dynamic Reconfiguration of Large Scale Distributed Applications," Proceedings of the Architectural Support for Dynamic Reconfiguration of Distributed Systems, May 4, 1998, pp. 1-8.

SYSTEMS AND METHODS FOR AUTOMATED AND DISTRIBUTED CONFIGURATION OF COMPUTING DEVICES

CROSS REFERENCE TO RELATED APPLICATIONS

This application is a continuation of U.S. application Ser. No. 16/360,235, filed Mar. 21, 2019, now U.S. Pat. No. 11,016,784, which claims the benefit under 35 U.S.C. § 119(e) of U.S. Application No. 62/815,911, filed Mar. 8, 2019, the contents of each is incorporated by reference in its entirety into the present disclosure.

TECHNICAL FIELD

This disclosure relates to approaches for configuring multiple computing devices.

BACKGROUND

A collection of services may be used to effectuate a platform for analyzing various datasets. Such a platform may be deployed, e.g., in the cloud on a server. However, when the number of services exceeds some threshold, for example, three concurrent services, coordinating interactions between the services becomes difficult if not impossible. Thus, a centralized entity may be used to coordinate those services, where the centralized entity controls turning services on/off, for example, while managing configuration files for those services.

When those services are to be deployed to multiple laptop computers, e.g., when a user wishes to analyze datasets using/accessing the platform from a laptop computer remotely located from the server, those services/that platform is adapted for deployment on the laptop computer. When the number of laptop computers on which those services/the platform is to be deployed increases, e.g., in the range of anywhere from three to four up to hundred or even more, configuration of each of those laptop computers becomes an onerous task, oftentimes requiring manual configuration of each of the services. Moreover, there is no certainty that the manually-implemented configuration files will result in proper deployment and/or adaption of the services/platform.

SUMMARY

A claimed solution rooted in computer technology overcomes problems specifically arising in the realm of computer technology. In accordance with one embodiment, a laptop computer may comprise one or more processors, and a memory storing instructions that, when executed by the one or more processors, cause the system to perform the following operations. The laptop computer may receive a configuration file including configuration parameters associated with multiple services of a platform deployment to be mirrored on a plurality of laptop computers including the laptop computer. The laptop computer may render the configuration file, the rendering resulting in multiple subset configuration files, each of the multiple subset configuration files corresponding to each of the multiple services. The laptop computer may store each of the multiple subset configuration files in one or more appropriate sections of the laptop computer's file system. The laptop computer may implement each of the multiple services on the laptop computer to effectuate a mirror of the platform deployment on the laptop computer.

In some embodiments, the configuration parameters include override parameters customizing at least one of operation and implementation of each of the multiple services on the laptop computer.

In some embodiments, the override parameters supersede one or more configuration parameters applicable to a server instance of the platform deployment.

In some embodiments, the override parameters include local host information associated with each of the plurality of laptop computers to replace uniform resource locator information for accessing one or more resources in a server instance of the platform deployment.

In some embodiments, the configuration parameters include secret information needed by the laptop to implement each of the multiple services on the laptop computer.

In some embodiments, the configuration parameters include user-facing information associated with each of the multiple services.

In some embodiments, the configuration file is written, at least in part, with a templating language allowing one or more of the multiple services to reference data of at least one other service of the one or more multiple services.

In some embodiments, the instructions cause the processor to replace the reference to the data with a value associated with the data stored in relation to at least one other service of the one or more multiple services.

In some embodiments, the templating language comprises one or more textual indicators encapsulating the reference to the data.

In some embodiments, the reference to the data comprises a key-value pair.

In some embodiments, the configuration file comprises one or more labels indicative of and demarcating each of the multiple services in the configuration file.

In accordance with another embodiment, a host computer may comprise one or more processors, and a memory storing instructions that, when executed by the one or more processors, cause the host computer to perform the following operations. The host computer may receive input defining a configuration file including configuration parameters associated with multiple services of a platform deployment to be mirrored on a plurality of laptop computers, wherein the configuration parameters are organized into multiple subset configuration files corresponding to each of the multiple services. The host computer may generate the configuration file. The host computer may disseminate the configuration file to each of the plurality of laptop computers.

In some embodiments, the instructions, when executed by the one or more processors, further cause the host computer to monitor payload status and history associated with the configuration file.

In some embodiments, the host computer further comprises a configuration editor through which the input defining the configuration file is received.

In some embodiments, the input defining the configuration file comprises default configuration parameters associated with the multiple services of the platform deployment to be mirrored.

In some embodiments, the instructions, when executed by the one or more processors, cause the host computer to receive further input through the configuration editor, the further input customizing the configuration parameters for operation and implementation on the plurality of laptop computers.

In some embodiments, the configuration editor operates in accordance with a templating syntax allowing for specifying data associated with at least one of the multiple services to be referenced by least one other service of the multiple services.

In some embodiments, the referencing of the data is reflected through a key-value pair.

In some embodiments, the configuration parameters comprise at least one of override parameters superseding one or more configuration parameters applicable to a server instance of the platform deployment, secret information needed by each of the plurality of laptop computers to implement each of the multiple services on each of the plurality of laptop computers, and user-facing information associated with each of the multiple services.

In some embodiments, the multiple subset configuration files corresponding to each of the multiple services are denoted with labels.

These and other objects, features, and characteristics of the systems and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

BRIEF DESCRIPTION OF THE DRAWINGS

Certain features of various embodiments of the present technology are set forth with particularity in the appended claims. A better understanding of the features and advantages of the technology will be obtained by reference to the following detailed description that sets forth illustrative embodiments, in which the principles of the technology are utilized, and the accompanying drawings of which:

DETAILED DESCRIPTION

As noted above, under conventional approaches, a centralized configuration entity or platform may be used to coordinate multiple services being used to effectuate a platform for analyzing data. In some scenarios, a user may wish to analyze data using or accessing the platform from a computing system or device, such as a laptop computer, that is remote from one or more server resources or a server on which the platform is implemented. Accordingly, a platform may be adapted for deployment on a remote computing device. That is, a local application may be used to replicate the functionality of the centralized entity on the remote computing device.

However, in conventional systems, when using laptops or other remote computing devices, configuration files for the aforementioned services are manually written for each laptop, without any certainty that the configuration files would result in proper service/platform operation on the laptops. When a platform is to be deployed to a large number of laptops, e.g., on the order of a hundred or more, configuration file management becomes unfeasible with conventional approaches.

A claimed solution rooted in computer technology overcomes problems specifically arising in the realm of computer technology. In various embodiments, a layer built effectively on top of the centralized entity infrastructure allows an overall configuration file encompassing all the services needed for a platform deployment on a laptop to be written/developed based on the configuration files of each service in the cloud deployment. The overall configuration file may be generated from a combination of manual and automated actions. For example, the overall configuration may begin as an aggregate of all default services running in a platform deployment through automated copy-paste operations. Adjustments to the default configurations can be made, e.g., by an administrator. For example, uniform resource locators (URLs) may be listed in the overall configuration file, whereas on a laptop, a local host may be used. Accordingly, the URLs can be replaced.

Elements of a configuration file can include, e.g., override parameters that allow customization of a service (originally deployed on a server) for execution on a laptop, a description of secret information (e.g., passwords), user-facing information, and/or other service-related information. It should be noted that the overall configuration file may include references to another service, i.e., configuration parameters/values used in one service can be shared and used by another service. This can be achieved through the use of a templating language.

The overall configuration file may then be pushed to multiple laptops. Each of the multiple laptops may receive the overall configuration file, and the configuration file can be rendered. That is, the various sections of the overall configuration file relevant to the laptop can be identified, and put into the correct place(s) on the laptop's file system, turning the overall configuration file into different configuration files for use in multiple services on the laptop. A platform payload status/history can be maintained, allowing users to build and/or test releases without publishing until desired or safe. Moreover, the platform payload status/history can be referenced for, e.g., the most-up-to-date configuration(s).

Example Data Analysis System

As noted above, a remote computing device, such as a laptop, may be configured to access one or more server resources needed to conduct data analysis, such as an investigation, remote from the server. Resources needed to conduct an investigation may include a portion of a database and/or one or more functionalities of a data analysis platform. Based on the investigation to be conducted (e.g., type of investigation, location of investigation, personnel involved, etc.), different amounts/types of resources may be obtained from the server. By obtaining a subset of resources from the server, the remote computing device is able to (1) conduct the investigation without any active connection with the server, and (2) maintain a compact database/application that is necessary to conduct the investigation. The investigation may be conducted via a web application that runs on the remote computing device. The web application may access the resources obtained from the server. The results of the investigation may be sent by the remote computing device to the server. The remote computing device may receive updates from the server. In some embodiments, the remote computing device may act as a server for other remote systems that are conducting investigations. The web applications running on the other remote systems may access the resources from the remote computing device. The results of the investigation may be sent by the other remote systems to the remote computing device, which may then send the results to the server. An example data analysis system is described in U.S. patent application Ser. No. 15/383,812, which is incorporated herein by reference in its entirety.

Figure 1:
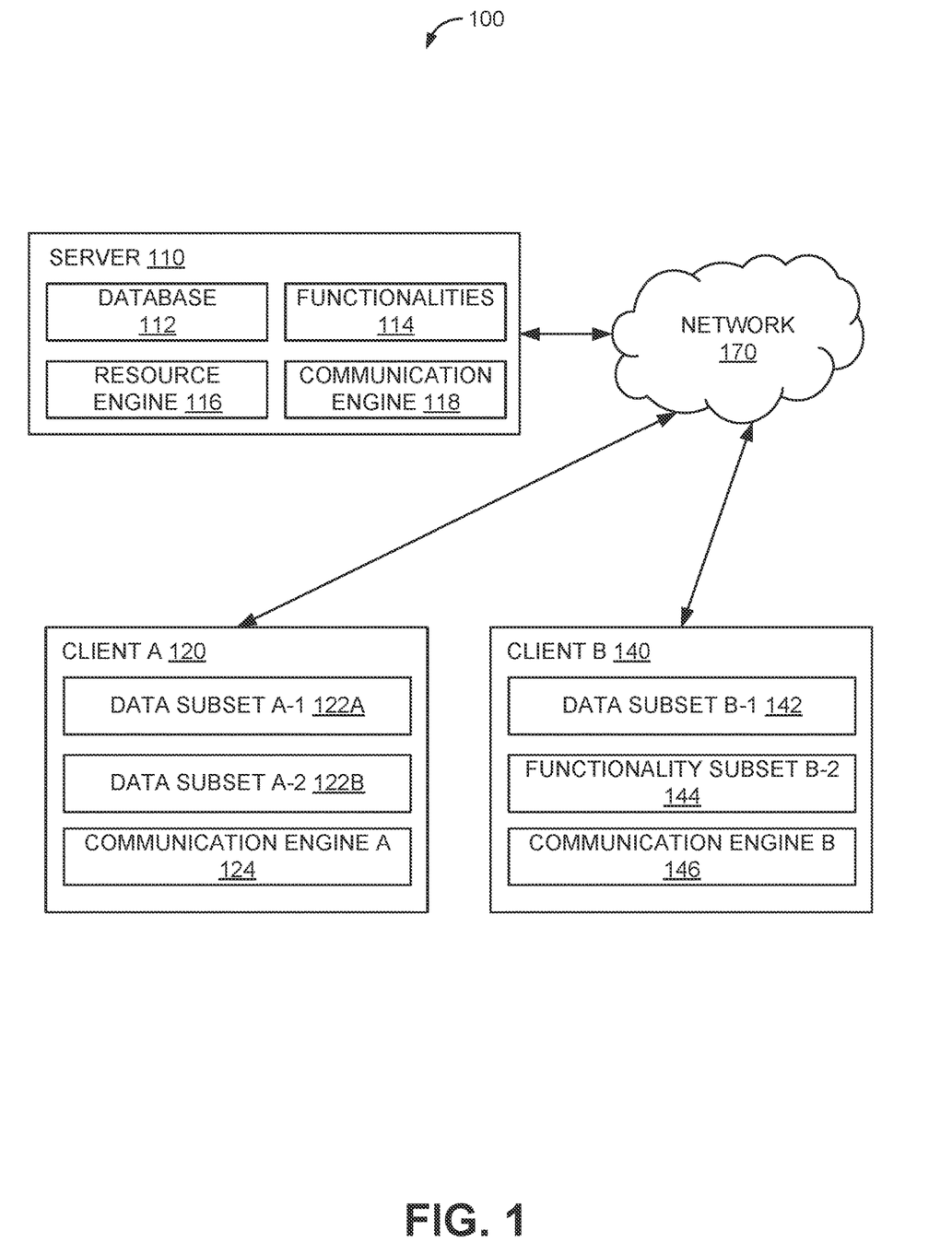
FIG. 1 illustrates an example data analysis system in accordance with one embodiment of the present disclosure.

FIG. 1 illustrates an example data analysis system 100 while having limited network connectivity to a server, in accordance with various embodiments. System 100 may include a server 110, a client A 120, and a client B 140. Server 110, client A 120, and client B 140 may include one or more processors and memory. The processor(s) may be configured to perform various operations by interpreting machine-readable instructions stored in the memory. Server 110 may communicate with client A 120 and/or client B 140 via a network 170. System 100 may also include a data store that can be a part of or accessible to server 110 and/or one or more of clients 120, 140 via network 170. In some embodiments, the data store may include various databases, for example, database 112, application functionalities, application/data packages, and/or other data that are available for download, installation, and/or execution.

In various embodiments, server 110 may have access to resources required by data analysis applications to facilitate analysis by one or more users. Server 110 may include the aforementioned database 112, functionalities 114, a resource engine 116, and a communication engine 118. Database 112 may include a structured set of data that can be divided/extracted for provision when needed by a client device (e.g., client A 120, client B 140). The data stored in database 112 may include raw data or processed data. For example, database 112 may include raw data of aerial view maps of various locations and may include processed data of roadways, pathways, and/or emergency routes that may be overlaid over the aerial view maps. As another example, database 112 may include raw data of weather information and may include processed information of predicted weather patterns. The functionalities 114 may include one or more functionalities for, e.g., an investigation application, using a subset of data from database 112 to facilitate an investigation. Functionalities for an investigation application may include different data analysis modules that allows the investigation application to perform different data analysis tasks, patches for the investigation application, custom application/functionalities built for particular investigations, administrative tasks to be executed by client devices 120, 140 and/or different permissions for the investigation application to change/operate on the data received from database 112.

Resource engine 116 may be configured to determine one or more resources for an investigation to be performed remotely from server 110. Resource engine 116 may select one or more data (e.g., a subset of data from database 112 or data store) and/or one or more functionalities (a subset of functionalities from functionalities 114 or data store) for an investigation based on the investigation to be conducted, based on a user interaction with server 110, based on a user interaction with a client device (e.g., client A 120, client B 140) and/or other information. Resource engine 116 may have preset and/or previously defined sets of data/functionalities for different types of investigations, different locations of investigations, and/or different personnel involved in the investigations. Resource engine 116 may enable a user operating through a terminal (coupled with server 110 and/or a client device 120, 140) to select particular data and/or functionalities needed for an investigation. For example, the users may select a customized data set from database 112 based on a temporal and/or a geospatial filter, which enables the users to take the most relevant information for the investigation while reducing the size of the data set taken from database 112. Taking a subset of the database 112 may increase the speed and performance of the server 110, and client devices 120, 140 during investigations.

Resource engine 116 may create one or more resource packages from the data (e.g., a subset of data from database 112 or data store) and/or functionalities (a subset of functionalities from functionalities 114 or data store) selected for an investigation. The resource packages created by the resource engine 116 may include database/data analytics ontologies that may be used by the client devices 120, 140 during investigations. Resource engine 116 may include one or more updated data/functionalities in a resource package. For example, resource engine 116 may have created an initial payload for the client A 120 to include a map of a region and/or information associated with the region. The map included in the resource package may be changed at a later time. For example, details may be added/removed from the map and/or one or more conditions (weather conditions) included with the map may change over time. Rather than including a new map with new information in the resource package, resource engine 116 may include changes to the map in the resource package so that client A 120, for example, can locally incorporate the changes into the map. Including updates to previously sent data/functionalities, rather than including new data/functionalities, may reduce the size of the resource package to be sent to client A 120. In some embodiments, the resource engine 116 may enable offline syncing (storage and transfer of resource packages via physical media) between server 110 and client devices 120, 140.

In various embodiments, the server 110 and/or the client devices 120, 130 may allow for user-management of the data selected for analysis. For example, data selected for an investigation may include a map cache (a collection of map tiles) of the location at which the investigation will be conducted. Users may use server 110 and/or the client devices 120, 140 to manually create map caches of the relevant location before deployment so that the data about the location is stored locally within the client devices 120, 140. By storing the map caches locally within client devices 120, 140, a user may use client devices 120, 140 to view the maps with little or no connection with server 110. The users may change the map caches during the investigation by including more, less, and/or different information within the map caches.

The users may define one or more parameters of the map cache. The users may define the location(s) for which the map cache will be defined. The users may define the levels/types of details to be included in the map cache. In some embodiments, the data selected for an investigation (e.g., map caches) may be stored at server 110 for reuse. In some embodiments, the data selected for an investigation may not be stored—for example, a one-time map cache may be created for inclusion in a resource package.

Communication engine 118 may be configured to send one or more resources for an investigation to a client device (e.g., client A 120 or client B 140). Communication engine 118 may be configured to send one or more updates for one or more resources to a client device. Communication engine 118 may be configured to receive one or more results of an investigation from a client device. For example, communication engine 118 may send resources and/or updates to resources to client A 120 and/or client B 140 by sending one or more resource packages discussed above. Communication engine 118 may send and/or receive data from a client device when the client device syncs with the server. For example, server 110 may include one or more resource packages containing new map caches, updated map caches, software updates/patches, and/or other information for a client device. When a client device connects with server 110 for a data sync, communication engine 118 may send the resource package(s) to the client device for installation/use.

Communication engine 118 may receive results of an investigation from the client A 120 and/or the client B 130 and incorporate the results into the database 112. For example, communication engine 118 may receive and incorporate changes to data stored in database 112 and/or may receive and incorporate new records for inclusion in the database 112. In some embodiments, communication engine 118 may receive operating information about client devices (e.g., operation logs), which enable users of server 110 to assist in solving issues with the client devices (e.g., writing/fixing mission-specific tools).

In some embodiments, communication engine 118 may record full lineage and history of data as different users make changes to the data in the database 112 (e.g., via interaction with the data subset A-1 122A and/or the data subset A-2 122B). In some embodiments, communication engine 118 may hide one or more lineage and/or history information when sharing the results of the investigation. In some embodiments, communication engine 118 may implement a network protocol designed to allow for data transfers in locations where the network connection to the server is only periodically available or unreliable. In some implementations, the network protocol may enable communication engine 118 to reroute communications between server 110 and one or more of client devices 120, 140.

In various embodiments, client A 120 may include data subset A-1 122A, data subset A-2 122B, and a communication engine A 124. Client A 120 may include a data analysis platform that enables a user to utilize resources obtained from server 110 to conduct one or more investigations. The user may use an investigation application (e.g., a web application) that exposes the data obtained from the server 110 and locally stored at client A 120 to conduct the investigations and provide inputs into the data/investigation. The use of the data obtained from server 110 and locally stored at client A 120 may enable one or users to conduct investigations without having an active network connection with server 110. In some embodiments, the investigation application may be executed at client A 120 (e.g., a user uses a web application from the client A 120 to conduct the investigation). In some embodiments, the investigation application may be executed at a client device served by client A 120 (e.g., a user uses a web application from another client device to access the resources stored at client A 120 and conduct the investigation). In some embodiments, the client A 120 may communicate with different servers as needed when changing locations.

Inputs provided by the users using the client A 120 may be synced back to the server 110. The users may use the investigation application to change the received data and/or make new records to be sent to server 110 for incorporation into database 112. In some embodiments, the scope of the use of the data by the users may be limited based on the types of users.

Communication engine A 124 may be configured to receive one or more resources (e.g., data subset A-1 122A, data subset A-2 122B) for an investigation from server 110. Communication engine A 124 may be configured to receive one or more updates for one or more resources from the server 110. Communication engine A 124 may be configured to send one or more results of an investigation to server 110. The results of an investigation may be sent during the investigation and/or after the investigation. For example, communication engine A 124 may receive resources and/or updates to resources from server 110 by receiving one or more resource packages discussed above. Communication engine A 124 may send results of an investigation to the server 110, which may then be incorporated into the database 112. In some embodiments, communications engine A 124 may send operating information about the client A 120 (e.g., operation logs), which may enable users of server 110 to assist in solving issues with the client A 120 (e.g., writing/fixing mission-specific tools). Communication engine A 124 may implement the network protocol described above to allow for data transfers in locations where the network connection to the server is only periodically available or unreliable.

Data subset A-1 122A and data subset A-2 122B may include one or more data needed for a user to conduct an investigation using client A 120. Data subset A-1 122A and data subset A-2 122B may include a subset of the database 112. The data subset A-1 122A and the data subset A-2 122B may include one or more of the same data from the database 112 and/or may include one or more of different data from the database 112. Data subset A-1 122A and the data subset A-2 122B may be used for the same investigation or for different investigations. The user may use the investigation application executed at client A 120 to expose data subset A-1 122A and/or data subset A-2 122B. The user may user the investigation application executed at the client A 120 to conduct the investigation and provide inputs to the data/investigation without having an active network connection with server 110.

In various embodiments, client B 140 may include a data subset B-1 142, a functionality subset B-1 144, and a communication engine B 146. Client B 140, like client A 120, may include a data analysis platform that enables a user to utilize data obtained from server 110 to conduct one or more investigations. The user may use an investigation application (e.g., a web application) that exposes the data obtained from server 110 and locally stored at the client B 140 to conduct the investigations and provide inputs into the data/investigation. Client B 140 may have the same, similar, or different functionality as that of client A 120 described above.

Communication engine B 146 may be configured to receive one or more resources (e.g., the data subset B-1 142, the functionality subset B-1 144) for an investigation from server 110. Communication engine B 146 may be configured to receive one or more updates for one or more resources from server 110. Communication engine B 146 may be configured to send one or more results of an investigation to server 110. Communication engine B 146 may be configured to implement some, or all, of the functionalities of the communication engine A 124 as described above.

Data subset B-1 142 may include one or more data needed for a user to conduct an investigation using client B 140. Data subset B-1 142 may include a subset of database 112. The user may use the investigation application executed at client B 140 to expose the data subset B-1 142. The user may user the investigation application executed at client B 140 to conduct the investigation and provide inputs to the data/investigation without having an active network connection with the server 110.

Functionality subset B-1 144 may include one or more functionalities for the investigation application using the data subset B-1 142. Functionality subset B-1 144 may include a subset of data analysis module, patches for the investigation application, custom applications/functionalities built for investigations, and/or permissions for the investigation application executed on the client B 140 and/or served by client B 140 to change/operate on data subset B-1 142. For example, functionality subset B-1 144 may allow certain users (e.g., administrators) to create and run administrative tasks on the client B 140, such as collecting diagnostics about client B 140, deploy emergency software updates for investigation applications or other components of client B 140, etc.

The particular functional blocks and arrangement of system 100 may be altered from the depicted configuration based on particular implementation details. In some embodiments, functional blocks may be combined or subdivided based on the available processing resources and hardware. Some functional blocks may be unused or omitted based on the particular application of system 100.

Configuration File

As alluded to above, scenarios can arise where multiple remote computing devices, such as laptops, would benefit from mimicking automated service configuration on hosts in a distributed computing environment. An example of systems and methods for automated service configuration in a distributed environment is described in U.S. application Ser. Nos. 15/284,957, 15/284,959, which are incorporated herein by reference in its entirety. A service can be a single instance of a software product or software application installed on one or more hosts in the distributed computing environment, or other set(s) of installable and computer-executable instructions along with associated configuration information and metadata. For example, a service might be a database server instance, a web server instance, or any other instance of a software product or a software application installed on one or more hosts. In some instances, a service is a network "server" service in that responds to network requests from other network "client" services. A server can be both a server service and a client service, or just a client service, or just a server service. Furthermore, a service can be, but need not be, a network service. That is, a service may perform operations at one or more hosts without sending or responding to network requests.

A host can be a single computing device. For example, a host can be a single server computing device. Alternatively, a host can be a single virtual computer instance that executes on a computing device facilitated by a virtualization layer (e.g., a Type 1 or Type 2 hypervisor) interposed between the virtual computer instance and the computing device. Regardless if a single computing device or a single virtual computer instance, a host can be configured with an operating system (e.g., UNIX, LINUX, or WINDOWS) that manages the low-level aspects of host operation including managing execution of processes, memory allocation, file input and output (I/O), and device I/O. A host may also be configured with a container platform (e.g., DOCKER) for running services within containers on the operating system. In conventional distributed environments, such as one or more data center facilities, or other computing hosting facilities connected to the Internet or other public or private network, services execute as processes on hosts that may be configured using a centralized entity (e.g., a distributed configuration platform).

Figure 2:
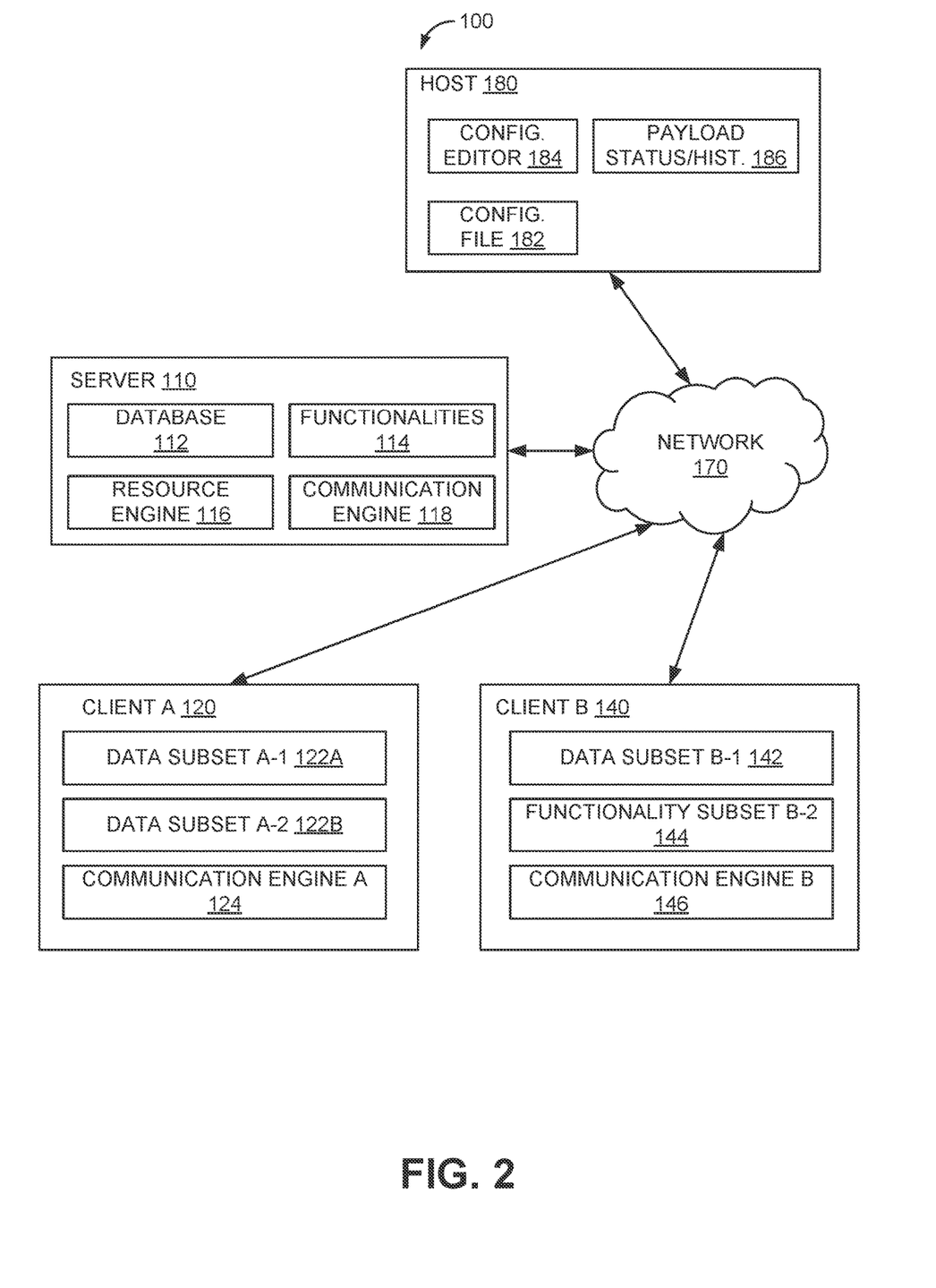
FIG. 2 illustrates an example centralized entity with overall configuration creation and distribution capabilities implemented in the example data analysis system of FIG. 1.
Figure 5:
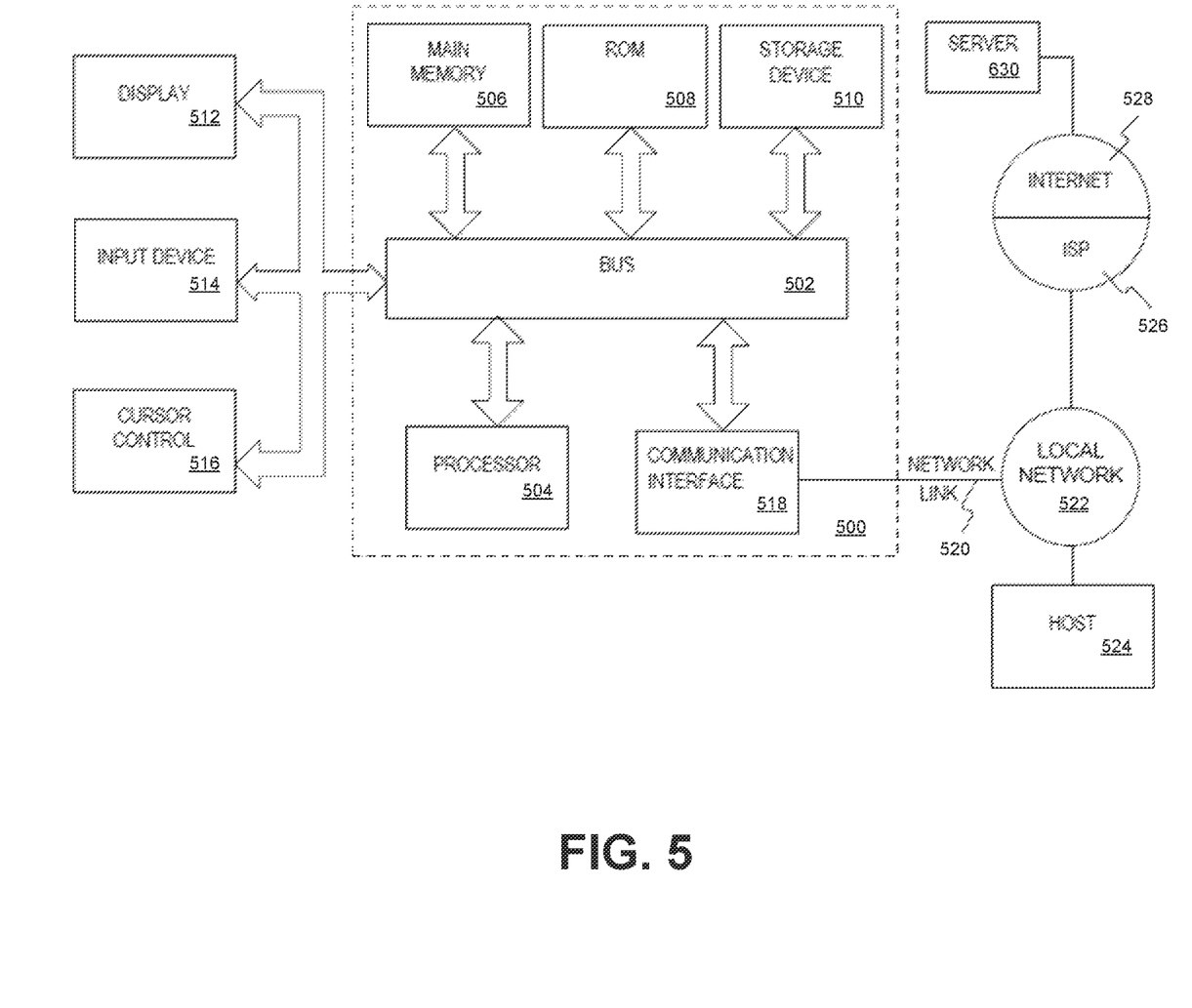
FIG. 5 illustrates a schematic representation of an example computer system in which any of the implementations described herein may be implemented.

In various embodiments, a layer built on top of a centralized entity infrastructure, such as a host running a configuration platform, allows an overall configuration file encompassing all the services needed for a platform deployment on a laptop to be written/developed based on the configuration files of each service in the cloud deployment. FIG. 2 illustrates a host 180 that may act as the centralized entity on which a configuration platform is run. Host 180 may be a single computing device such as, for example, computer system 500 described below with respect to FIG. 5. Alternatively, host 180 may be a single virtual computer instance that executes on a computing device, such as computer system 500 facilitated by a virtualization layer interposed between the virtual computer instance and the computing device. In one embodiment, the configuration platform may be embodied as a CloudStack comprising a management server running on a first virtual machine, and a second virtual machine acting as the cloud infrastructure. The management server aspect of the CloudStack can create, control (e.g., turn on/off), and deploy various services as will be described below.

The overall configuration file, e.g., configuration file 182, may be generated from a combination of manual and automated actions and represents configurations for every service intended to be deployed to remote computing devices, such as clients 120, 140. For example, a user, such as an administrator, platform developer, platform provider, etc. may use a configuration editor 184 to generate some or all of configuration file 182. For example, the overall configuration may begin as an aggregate of all default services running in a platform deployment through automated copy-paste operations. Adjustments to the default configurations can be made, e.g., by an administrator via configuration editor 184.

It should be understood that a service may have configuration information that the service uses to set execution parameters of the service. The execution parameters may be service-specific, that is, specific to the type of service or specific to a product that the service is an installation of. The configuration information of a service may be defined by a service definition stored as a set of key-values pairs that can be hierarchical or nested. A key name may be represented by character string data and can represent a path in a key namespace.

An example portion or block of an overall configuration file may be as follows, where the example portion has a configuration for the service itself running on a server. In other words, an overall configuration file may be comprised of multiple subset configuration files, each corresponding to a service.

```
conf:
    application port: 12345
    service_1:
        server:
            applicationConnectors:
                - certAlias: '{{ssl.cert_alias}}'
                  keyStorePassword: '{{ssl.keystore_password}}'
                  keyStorePath: '{{ssl.keystore.path}}'
                  port: '{{conf.application=port}}'
                  supportedProtocols:
                      - TLSv1.2
                  type: https
                  validateCerts: false
```

Based on the previous configuration file, which may be a default configuration file or a configuration for a server instance of a service, configuration information or parameters may be added or updated to reflect a desired configuration suitable for a remote computing device. An example is shown below.

```
conf:
    ...
    configuration_platform
        deployedServices:
            ...
            overrides:
                conf:
                    service_1:
                        server:
                            applicationConnectors:
                                - bindHost: 127.0.0.1
                                  certAlias: '{{"{{ssl.cert_alias}}"}}'
                                  port: 12345
                                  type: https
                                  validateCerts: false
```

It should be understood that remote computing device-specific configuration information can be added for services, e.g., a service named "service_1," that may be one of a plurality of deployed/to-be-deployed services on a remote computing device, such as clients 120, 140. Here, "configuration_platform" can refer to the remote computing device-specific configuration platform, while "configuration_service" can refer to the server-specific configuration service. In this way, a service(s) deployed on a remote computing device can operate and/or appear as desired on that remote computing device (that can be different from the server instance of that service). Labels such as the above-noted names may be used to indicate services to be configured and demarcate the blocks or subset configuration files corresponding to each service.

As will be described in greater detail, configuration file 182 may be disseminated to clients 120, 140. Clients 120, 140 can determine which services should be installed, determine which portion(s) of configuration file 182 are specific to each service, and put that portion or portions into the requisite place(s) on clients 120, 140. It should be understood that in some embodiments, configuration file 182 is the same for each remote computing device in a computing environment (or portion of a computing environment). In this way, the need for manual configuration in conventional systems is negated. Any time a particular remote computing device, e.g., client A 120 is to be updated, a new configuration file 182' may be disseminated, where client A 120 is able to apply any new configuration changes made at host 180.

Moreover, an override section (reflected in the above example of an overall configuration file) can be used to customize how a particular service is to run on a remote computing device, e.g., one or more parameters may supersede that of default configuration parameters for a server instance. For example, the overall configuration file may reflect a default configuration or configuration suitable for a server instance that should be customized for use on a laptop computer. The overall configuration file may further include a section including descriptions of secret information, such as passwords customized for laptops, for each service, and a section for user-facing information, such as the name of a service or a location of information a laptop user/administrator can view to monitor the operation of a service. For example, the overall configuration file may specify that upon bootup of client A 120, client A 120 should generate an administrator password, a login password, and a shared database password (e.g., for database 112 of server 110). Other sections of the overall configuration file may reflect other laptop-specific configuration aspects. It should be noted that remote computing devices need not send or reply with any configuration-related information back to host 180 (or centralized database). Rather, host 180 may simply push configuration file 182 (or updates) to remote computing devices, such as clients 120, 140.

In some embodiments, examples of which are reflected in the above-noted portions of a configuration file, a templating language or syntax may be used to allow for referencing of another value (of a key-value pair). In this way, two or more deployed services can be connected or interact. For example, a first service deployed on client A 120 can be configured to reference some aspect of a second service deployed on client A 120.

This templating language or syntax can be reflected with the use of key-value pair delineated by double brackets. The examples noted above refer to a secure socket layer (SSL) certificate alias "{{ssl.cert_alias}}" in double brackets indicating that the configuration file should replace what is referenced in the double brackets with an actual retrieved value. As will be described below, a remote computing device may run through a configuration file twice by first writing to memory with a reference to a value, retrieving the referenced value, and subsequently rendering the configuration file again to write the retrieved value to memory. As another example a configuration file may contain large numbers of references to URLs needed to effectuate one or more services, access data, etc. On a server instance, real DNS entries, host names, etc. may be utilized, whereas on a remote computing device, services may be running on a local host. Accordingly, the templating language allows the URLs to be replaced to reference the local host.

When deploying multiple services from a common provider, those multiple services may often utilize the same front-end interface, or at least may engage in some form of interaction, e.g., sharing of data to analyze, or receiving input at a first service from a second service and outputting some result from the first service to a third service. The use of the aforementioned templating language allows assets (one or more static collection of files made available to a user, e.g., a set of hypertext markup language (HTML) text) to be referenced and managed/moved/changed independently of a service relying on that asset. In this way, an entire service need not be disabled when an asset is updated or otherwise changed.

As illustrated in FIG. 2, host 180 may further include a payload status/history component 186 that can track the status of a current configuration file, as well as different iterations of a configuration file. For example, an administrator may wish to edit a default configuration using configuration editor 184. The administrator may wish to test or otherwise ensure (prior to exporting the configuration file, e.g., configuration file 182 to clients 120 and 140 via network 170) that the configuration file is in a safe or ready state. In some embodiments, payload status/history component 186 may include or comprise a table, entries of which reflect a most up-to-date version of configuration file 182 as well as prior versions thereof. The most up-to-date version of configuration file 182 can be entered upon the administrator exporting the platform payload. In some embodiments, remote computing devices may be allowed to query payload status/history component 186 to determine a most recent payload, and may be allowed to automatically update their current configuration file.

One benefit of tracking payload status/history is that remote computing devices, such as clients 120, 140 need not go down while a particular configuration is being updated, changed, tested, etc. Another benefit realized with the use of payload status/history component 186 is that remote computing devices can be configured with approved or safe configurations. Without the payload status/history component 186, client A 120 and client B could be pushed configurations that may or may not work. With payload status/history component 186, client A 120 and client B 140 can be configured with configuration file 182 at different states (built at different times), yet the configuration file 182 at each state/build time is safe. It should be understood that depending on the state of a configuration, a remote computing device may need to step through one or more intermediate versions of a configuration file to reach a latest version.

Still another benefit of centralized configuration in accordance with various embodiments (made possible by the use of an overall configuration file) is that configurations can be vetted prior to dissemination to remote computing devices. When managing configurations locally, conflicts can occur between different services, or different versions of the same or other services. Such conflicts can be avoided by configuring all the desired services at host 180 vis-à-vis certain services or functions already available in distributed configuration platforms that are able to detect and notify a user of conflicts. Further still, little to no user interaction is necessary to enable a platform deployment on a remote computing device. In fact, a user is generally unaware of any of the processes described herein.

Example Automated and Distributed Configuration

Figure 3:
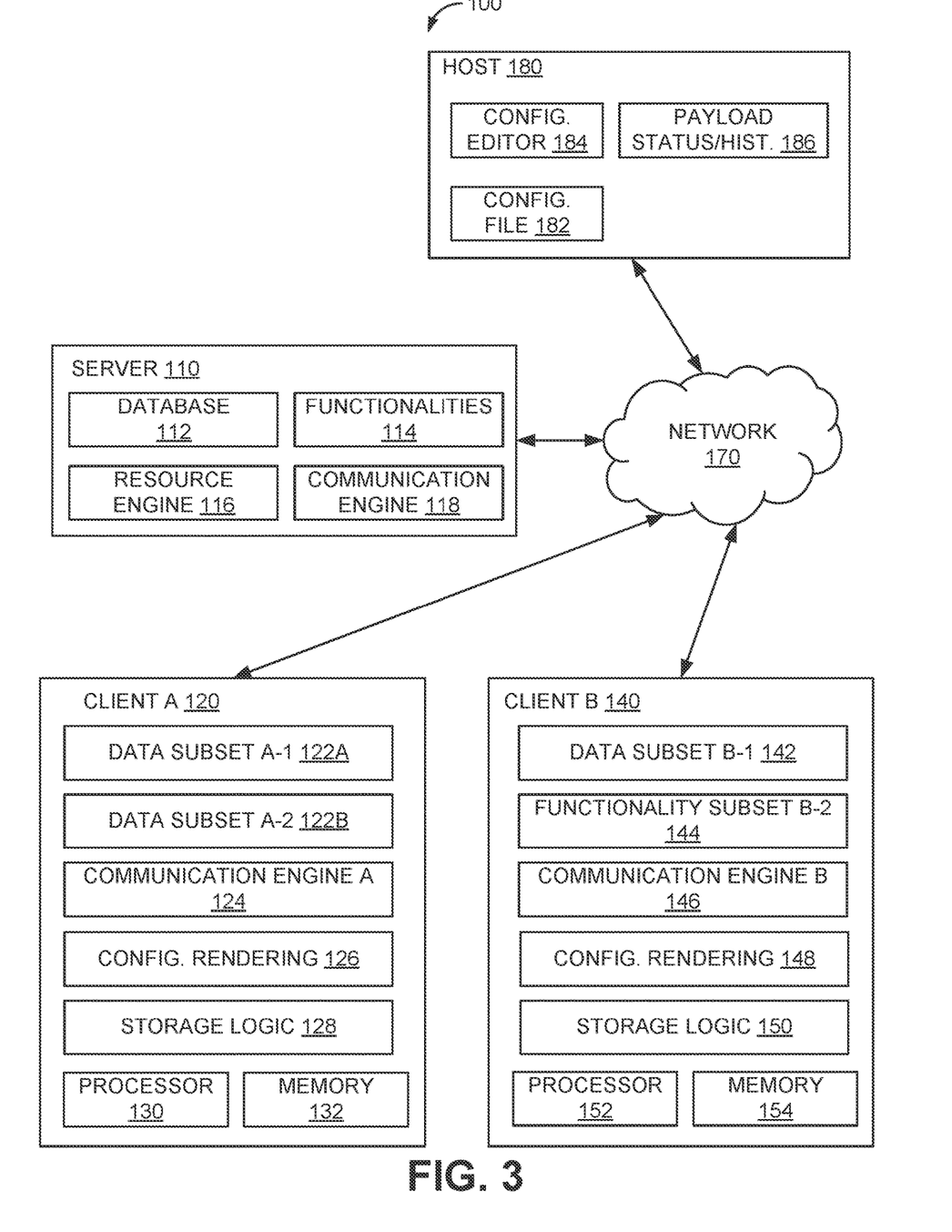
FIG. 3 illustrates example remote computing devices that may be configured in accordance with an overall configuration created by the example centralized entity of FIG. 2.

FIG. 3 illustrates remote computing device elements that can be used to effectuate a platform deployment that mirrors (or substantially mirrors) that of a service deployment. FIG. 3 will be described in conjunction with FIG. 4, an example flowchart of operations that may be performed to achieve the mirrored platform deployment in accordance with at least one embodiment. It should be noted that as used herein, the term mirror may not necessarily mean and exact duplicate or replica of server-instance of a platform deployment, but can be less that an exact duplicate or replica. For example, as discussed above, certain changes may be applied to a server instance of a platform deployment in order to customize implementation on a laptop computer. Additionally, a laptop deployment may not have precisely the same services. For example, one or more services may be deemed not appropriate for implementation on a laptop, and the corresponding configuration may not be included in the overall configuration file exported to the laptop.

Figure 4:
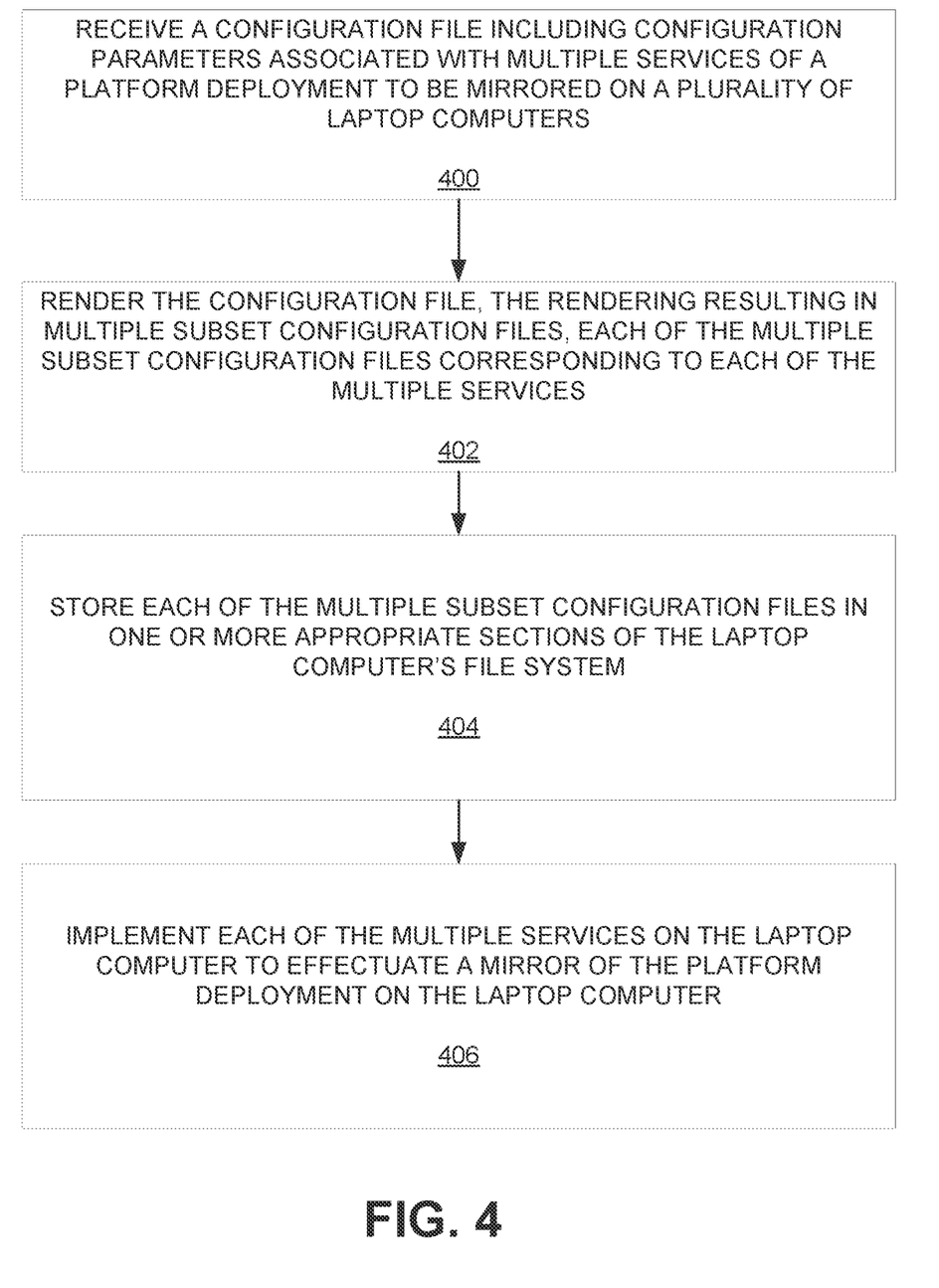
FIG. 4 is a flow chart illustrating example operations that may be performed to achieve automated and distributed configuration for remote computing devices in accordance with one embodiment of the present disclosure.

At operation 400, a configuration file including configuration parameters associated with multiple services of a platform deployment to be mirrored on a plurality of laptop computer is received. As discussed above, host 180 may export or disseminate a configuration file, e.g., configuration file to one or more remote computing devices, such as clients 120, 140.

At operation 402, the configuration file is rendered. For example, upon receipt of configuration file 182 at a remote computing device, such as client A 120, client A 120 can render configuration file 182 to look for one or more of the subset configuration files corresponding to services to be deployed thereon. For example, the first time client A 120 receives configuration file 182, it may assume that each of the subset configuration files correspond to all services to be deployed to client A 120.

At operation 404, each of the multiple subset configuration files can be stored in one or more appropriate sections of the laptop computer's file system. That is, configuration rendering component 126 in conjunction with storage logic 128 may write each of the subset configuration files of configuration file 182 to appropriate locations in memory 132. As alluded to above, the initial rendering of configuration file 182 may involve writing the subset configuration files including references to values. Configuration component 126 may render configuration file 182 a second time, using the referenced value that is written to memory 132. It should be understood that similarly, regarding client B 140, under the control of processor 152, configuration rendering component 148 in conjunction with storage logic 150 writes each of the subset configuration files of configuration file 182 to appropriate locations in its memory 154

At operation 406, each of the multiple services can be implemented on the laptop computer to effectuate a mirror of the platform deployment on the laptop computer. That is, each service corresponding to a subset configuration file contained within configuration file 182 may be installed on client A 120, where each service has been properly configured in accordance its corresponding subset configuration files.

Various embodiments disclosed herein provide automated configuration of remote computing devices from a centralized entity using a configuration file having subset configuration files corresponding to each service to be deployed on the remote computing devices. User interaction is minimal to non-existent, and users need not be aware of the configuration process(es) occurring on a remote computing device. A CloudStack-defined configuration can be prepared and made to be a fully running mirror of that CloudStack on a remote computing device. Configurations reflected in the configuration file can be tested, tweaked, and customized for use on the remote computing devices prior to dissemination to the remote computing devices. Any changes made to the configuration file are minimal as they are made relative to a base or default service configuration. Moreover, the embodiments disclosed herein are not limited by any remote computing device operating system. Further still, different services can interact with one another easily and with little to no conflict due to a templating language or syntax implemented in various embodiments.

Example Computer System

FIG. 6 is a block diagram of an example computer system 600 with which embodiments described herein can be implemented, consistent with embodiments of the present disclosure. Computer system 600 includes a bus 602 or other communication mechanism for communicating information, and one or more hardware processors 604 (denoted as processor 604 for purposes of simplicity) coupled with bus 602 for processing information. Hardware processor 604 can be, for example, one or microprocessors.

Computer system 600 also includes a main memory 606, such as a random access memory (RAM) or other dynamic storage device, coupled to bus 602 for storing information and instructions to be executed by processor 604. Main memory 606 also can be used for storing temporary variables or other intermediate information during execution of instructions to be executed by processor 604. Such instructions, after being stored in non-transitory storage media accessible to processor 604, render computer system 600 into a special-purpose machine that is customized to perform the operations specified in the instructions.

Computer system 600 further includes a read only memory (ROM) 608 or other static storage device coupled to bus 602 for storing static information and instructions for processor 604. A storage device 610, such as a magnetic disk, optical disk, or USB thumb drive (Flash drive), etc., is provided and coupled to bus 602 for storing information and instructions.

Computer system 600 can be coupled via bus 602 to a display 612, such as a cathode ray tube (CRT), a liquid crystal display (LCD), or a touch screen, for displaying information to a computer user. An input device 614, including alphanumeric and other keys, is coupled to bus 602 for communicating information and command selections to processor 604. Another type of user input device is cursor control 616, such as a mouse, a trackball, or cursor direction keys for communicating direction information and command selections to processor 604 and for controlling cursor movement on display 612. The input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computer system 600 can include a user interface component to implement a graphical user interface (GUI) that can be stored in a mass storage device as executable software codes that are executed by the one or more computing devices. This and other components can include, by way of example, components, such as software components, object-oriented software components, class components and task components, processes, functions, fields, procedures, subroutines, segments of program code, drivers, firmware, microcode, circuitry, data, databases, data structures, tables, arrays, and variables.

In general, the word "component," as used herein, refers to logic embodied in hardware or firmware, or to a collection of software instructions, possibly having entry and exit points, written in a programming language, such as, for example, Java, Lua, C or C++. A software component can be compiled and linked into an executable program, installed in a dynamic link library, or written in an interpreted programming language such as, for example, BASIC, Perl, or Python. It will be appreciated that software components can be callable from other components or from themselves, and/or can be invoked in response to detected events or interrupts. Software components configured for execution on computing devices can be provided on a computer readable medium, such as a compact disc, digital video disc, flash drive, magnetic disc, or any other tangible medium, or as a digital download (and can be originally stored in a compressed or installable format that requires installation, decompression, or decryption prior to execution). Such software code can be stored, partially or fully, on a memory device of the executing computing device, for execution by the computing device. Software instructions can be embedded in firmware, such as an EPROM. It will be further appreciated that hardware components can be comprised of connected logic units, such as gates and flip-flops, and/or can be comprised of programmable units, such as programmable gate arrays or processors. The components or computing device functionality described herein are preferably implemented as software components, but can be represented in hardware or firmware. Generally, the components described herein refer to logical components that can be combined with other components or divided into sub-components despite their physical organization or storage.

Computer system 600 can implement the techniques described herein using customized hard-wired logic, one or more ASICs or FPGAs, firmware and/or program logic which in combination with the computer system causes or programs computer system 600 to be a special-purpose machine. According to some embodiments, the operations, functionalities, and techniques and other features described herein are performed by computer system 600 in response to processor 604 executing one or more sequences of one or more instructions contained in main memory 606. Such instructions can be read into main memory 606 from another storage medium, such as storage device 610. Execution of the sequences of instructions contained in main memory 606 causes processor 604 to perform the process operations described herein. In alternative embodiments, hard-wired circuitry can be used in place of or in combination with software instructions.

The term "non-transitory media" as used herein refers to any non-transitory media storing data and/or instructions that cause a machine to operate in a specific fashion. Such non-transitory media can comprise non-volatile media and/or volatile media. Non-volatile media can include, for example, optical or magnetic disks, such as storage device 610. Volatile media can include dynamic memory, such as main memory 606. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from, but can be used in conjunction with, transmission media. Transmission media can participate in transferring information between storage media. For example, transmission media can include coaxial cables, copper wire and fiber optics, including the wires that comprise bus 602. Transmission media can also take the form of acoustic or light waves, such as those generated during radio-wave and infra-red data communications.

Various forms of media can be involved in carrying one or more sequences of one or more instructions to processor 604 for execution. For example, the instructions can initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 can optionally be stored on storage device 610 either before or after execution by processor 604.

Computer system 600 can also include a communication interface 618 coupled to bus 602. Communication interface 618 can provide a two-way data communication coupling to a network link 620 that can be connected to a local network 622. For example, communication interface 618 can be an integrated services digital network (ISDN) card, cable modem, satellite modem, or a modem to provide a data communication connection to a corresponding type of telephone line. As another example, communication interface 618 can be a local area network (LAN) card to provide a data communication connection to a compatible LAN. Wireless links can also be implemented. In any such implementation, communication interface 618 can send and receive electrical, electromagnetic or optical signals that carry digital data streams representing various types of information.

Network link 620 can typically provide data communication through one or more networks to other data devices. For example, network link 620 can provide a connection through local network 622 to a host computer 624 or to data equipment operated by an Internet Service Provider (ISP) 626. ISP 626 in turn can provide data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, can be example forms of transmission media.

Computer system 600 can send messages and receive data, including program code, through the network(s), network link 620 and communication interface 618. In the Internet example, a server 630 can transmit a requested code for an application program through Internet 628, ISP 626, local network 622 and communication interface 618.

The received code can be executed by processor 604 as it is received, and/or stored in storage device 610, or other non-volatile storage for later execution. In some embodiments, server 630 can provide information for being displayed on a display.

Each of the processes, methods, and algorithms described in the preceding sections may be embodied in, and fully or partially automated by, code components executed by one or more computer systems or computer processors comprising computer hardware. The processes and algorithms may be implemented partially or wholly in application-specific circuitry.

The various features and processes described above may be used independently of one another, or may be combined in various ways. All possible combinations and sub-combinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from, or rearranged compared to the disclosed example embodiments.

Engines, Components, and Logic

Certain embodiments are described herein as including logic or a number of components, engines, or mechanisms. Engines may constitute either software engines (e.g., code embodied on a machine-readable medium) or hardware engines. A "hardware engine" is a tangible unit capable of performing certain operations and may be configured or arranged in a certain physical manner. In various example embodiments, one or more computer systems (e.g., a standalone computer system, a client computer system, or a server computer system) or one or more hardware engines of a computer system (e.g., a processor or a group of processors) may be configured by software (e.g., an application or application portion) as a hardware engine that operates to perform certain operations as described herein.

In some embodiments, a hardware engine may be implemented mechanically, electronically, or any suitable combination thereof. For example, a hardware engine may include dedicated circuitry or logic that is permanently configured to perform certain operations. For example, a hardware engine may be a special-purpose processor, such as a Field-Programmable Gate Array (FPGA) or an Application Specific Integrated Circuit (ASIC). A hardware engine may also include programmable logic or circuitry that is temporarily configured by software to perform certain operations. For example, a hardware engine may include software executed by a general-purpose processor or other programmable processor. Once configured by such software, hardware engines become specific machines (or specific components of a machine) uniquely tailored to perform the configured functions and are no longer general-purpose processors. It will be appreciated that the decision to implement a hardware engine mechanically, in dedicated and permanently configured circuitry, or in temporarily configured circuitry (e.g., configured by software) may be driven by cost and time considerations.

Accordingly, the phrase "hardware engine" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented engine" refers to a hardware engine. Considering embodiments in which hardware engines are temporarily configured (e.g., programmed), each of the hardware engines need not be configured or instantiated at any one instance in time. For example, where a hardware engine comprises a general-purpose processor configured by software to become a special-purpose processor, the general-purpose processor may be configured as respectively different special-purpose processors (e.g., comprising different hardware engines) at different times. Software accordingly configures a particular processor or processors, for example, to constitute a particular hardware engine at one instance of time and to constitute a different hardware engine at a different instance of time.

Hardware engines can provide information to, and receive information from, other hardware engines. Accordingly, the described hardware engines may be regarded as being communicatively coupled. Where multiple hardware engines exist contemporaneously, communications may be achieved through signal transmission (e.g., over appropriate circuits and buses) between or among two or more of the hardware engines. In embodiments in which multiple hardware engines are configured or instantiated at different times, communications between such hardware engines may be achieved, for example, through the storage and retrieval of information in memory structures to which the multiple hardware engines have access. For example, one hardware engine may perform an operation and store the output of that operation in a memory device to which it is communicatively coupled. A further hardware engine may then, at a later time, access the memory device to retrieve and process the stored output. Hardware engines may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented engines that operate to perform one or more operations or functions described herein. As used herein, "processor-implemented engine" refers to a hardware engine implemented using one or more processors.

Similarly, the methods described herein may be at least partially processor-implemented, with a particular processor or processors being an example of hardware. For example, at least some of the operations of a method may be performed by one or more processors or processor-implemented engines. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an Application Program Interface (API)).

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

Language

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the subject matter has been described with reference to specific example embodiments, various modifications and changes may be made to these embodiments without departing from the broader scope of embodiments of the present disclosure. Such embodiments of the subject matter may be referred to herein, individually or collectively, by the term "invention" merely for convenience and without intending to voluntarily limit the scope of this application to any single disclosure or concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

It will be appreciated that an "engine," "system," "data store," and/or "database" may comprise software, hardware, firmware, and/or circuitry. In one example, one or more software programs comprising instructions capable of being executable by a processor may perform one or more of the functions of the engines, data stores, databases, or systems described herein. In another example, circuitry may perform the same or similar functions. Alternative embodiments may comprise more, less, or functionally equivalent engines, systems, data stores, or databases, and still be within the scope of present embodiments. For example, the functionality of the various systems, engines, data stores, and/or databases may be combined or divided differently.

"Open source" software is defined herein to be source code that allows distribution as source code as well as compiled form, with a well-publicized and indexed means of obtaining the source, optionally with a license that allows modifications and derived works.

The data stores described herein may be any suitable structure (e.g., an active database, a relational database, a self-referential database, a table, a matrix, an array, a flat file, a documented-oriented storage system, a non-relational No-SQL system, and the like), and may be cloud-based or otherwise.

As used herein, the term "or" may be construed in either an inclusive or exclusive sense. Moreover, plural instances may be provided for resources, operations, or structures described herein as a single instance. Additionally, boundaries between various resources, operations, engines, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Although the invention has been described in detail for the purpose of illustration based on what is currently considered to be the most practical and preferred implementations, it is to be understood that such detail is solely for that purpose and that the invention is not limited to the disclosed implementations, but, on the contrary, is intended to cover modifications and equivalent arrangements that are within the spirit and scope of the appended claims. For example, it is to be understood that the present invention contemplates that, to the extent possible, one or more features of any embodiment can be combined with one or more features of any other embodiment.

Other implementations, uses and advantages of the invention will be apparent to those skilled in the art from consideration of the specification and practice of the invention disclosed herein. The specification should be considered exemplary only, and the scope of the invention is accordingly intended to be limited only by the following claims.

The invention claimed is:

1. A computing device, comprising:
   one or more processors; and
   a memory storing instructions that, when executed by the one or more processors, cause the computing device to perform:
      determining services to be installed onto the computing device;
      receiving a configuration file including configuration parameters associated with multiple services of a platform deployment;
      identifying sections of the configuration file corresponding to the determined services;
      writing each of the sections of the configuration file in one or more appropriate sections of the memory of the computing device, wherein at least a subset of the sections of the configuration file are also written onto at least a subset of the other computing devices belonging to a same cluster as the computing device;
      implementing each of the services on the computing device to effectuate a mirror of the platform deployment on the computing device; and
      receiving, from a second computing device within the same cluster, an indication of a data change command associated with the configuration file;
      establishing a consensus with a majority of the other computing devices regarding an order of the data change command, relative to other data change commands; and
      replicating the data change command in a log of the computing device such that the data change command is incorporated in a same relative order at the log of the computing device and at a second log of the second computing device.

2. The computing device of claim 1, wherein the data change command includes creating, updating, or removing one or more keys and values associated with the keys, the values indicating configuration information associated with the configuration file.

3. The computing device of claim 1, wherein the instructions further cause the computing device to perform:
   in response to a failure of the computing device, recovering the configuration file that includes the replicated data change command so that the computing device rejoins the cluster.

4. The computing device of claim 3, wherein the recovering of the configuration file that includes the replicated data change command is dependent upon a majority of computing devices within the cluster incorporating the replicated data change command.

5. The computing device of claim 1, wherein the failure of the computing device includes a crash, suspension, hanging, or rebooting of the computing device.

6. The computing device of claim 1, wherein the instructions further cause the computing device to perform:
   transmitting the data change command to a third computing device within the cluster such that the data change command is incorporated in the same relative order at a third log of the third computing device.

7. The computing device of claim 1, wherein the consensus includes recording a replica of a current configuration status that is robust against a network delay, partition, packet loss, duplication, or re-ordering.

8. The computing device of claim 7, wherein the data change command includes updating a key and a value indicating a parameter associated with the key, wherein the updating of the key includes assigning a revision identifier to the updated key.

9. The computing device of claim 2, wherein the keys are stored in a hierarchical key space.

10. The computing device of claim 2, wherein the values indicate pending tasks to be performed by the computing device and other computing devices in the cluster, and dependencies among the pending tasks.

11. A host computer, comprising:
   one or more processors; and
   a memory storing instructions that, when executed by the one or more processors, cause the host computer to perform:
      recording, in a replicated log, data change commands corresponding to a configuration file;
      receiving a data change command from an other host computer;
      replicating the data change command in response to a consensus being established among the host computer and other host computers; and
      transmitting the data change command to the other host computers.

12. The host computer of claim 11, wherein the data change command includes creating, updating, or removing one or more keys and values associated with the keys, the values indicating configuration information associated with the configuration file.

13. The host computer of claim 11, wherein the instructions further cause the host computer to perform:

in response to a failure of the host computer, recovering the configuration file that includes the replicated data change command so that the computing device rejoins the cluster.

14. The host computer of claim 13, wherein the recovering of the configuration file that includes the replicated data change command is dependent upon a majority of computing devices within the cluster incorporating the replicated data change command.

15. The host computer of claim 11, wherein the failure of the host computer includes a crash, suspension, hanging, or rebooting of the host computer.

16. The host computer of claim 11, wherein the instructions further cause the computing device to perform:

transmitting the data change command to a third host computer within the cluster such that the data change command is incorporated in the same relative order at a third log of the third host computer.

17. The host computer of claim 11, wherein the consensus includes recording a replica of a current configuration status that is robust against a network delay, partition, packet loss, duplication, or re-ordering.

18. The host computer of claim 11, wherein the data change command includes updating a key and a value indicating a parameter associated with the key, wherein the updating of the key includes assigning a revision identifier to the updated key.

19. The host computer of claim 12, wherein the keys are stored in a hierarchical key space.

20. The host computer of claim 12, wherein the values indicate pending tasks to be performed by the host computer and other host computers in the cluster, and dependencies among the pending tasks.

* * * * *